United States Patent
Sivaramakrishnan et al.

(10) Patent No.: US 12,124,399 B2
(45) Date of Patent: Oct. 22, 2024

(54) UNIVERSAL SERIAL BUS (USB) CONTROLLER, METHOD OF OPERATING A USB CONTROLLER, AND MACHINE VISION SYSTEM

(71) Applicant: Cypress Semiconductor Corporation, San Jose, CA (US)

(72) Inventors: Karthik Sivaramakrishnan, Bangalore (IN); Hamid Khodabandehlou, Milpitas, CA (US); Godwin Arulappan, Sunnyvale, CA (US); Jagadeesan Rajamanickam, San Jose, CA (US); Manaskant Dipakkumar Desai, Bangalore (IN); Nimish Thakkar, Bangalore (IN)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 61 days.

(21) Appl. No.: 18/093,565

(22) Filed: Jan. 5, 2023

(65) Prior Publication Data
US 2024/0232124 A1 Jul. 11, 2024

(51) Int. Cl.
*G06F 13/14* (2006.01)
*G06F 13/42* (2006.01)
*H04N 23/66* (2023.01)

(52) U.S. Cl.
CPC ......... *G06F 13/4291* (2013.01); *H04N 23/66* (2023.01); *G06F 2213/0042* (2013.01)

(58) Field of Classification Search
None
See application file for complete search history.

(56) References Cited

U.S. PATENT DOCUMENTS

2017/0185547 A1* 6/2017 McGowan .............. G06F 13/36

OTHER PUBLICATIONS

USB 3.2 Specification (Year: 2017).*
"Universal Serial Bus 3.2 Specification", Revision 1.1, Jun. 2022, Jun. 2022, pp. 1-538.

* cited by examiner

*Primary Examiner* — Henry Tsai
*Assistant Examiner* — Dean Phan
(74) *Attorney, Agent, or Firm* — Murphy, Bilak & Homiller, PLLC (57) ABSTRACT

A USB controller includes: a USB interface that receives an isochronous timestamp packet (ITP) from a host device that includes a current time value from the host device and a delay value associated with each hub through which the ITP passed; controller hardware that initiates a counter, sends a link delay measurement (LDM) link management packet (LMP) request to a nearest upstream hub, stores a first timestamp that corresponds to when the LDM LMP request was sent, receives an LDM LMP response from the nearest upstream hub, and stores a second timestamp that corresponds to when the LDM LMP response was received; and controller software that calculates a link delay between the USB controller and the nearest upstream hub based on the first and second timestamps and delay information included in the LDM LMP response, and adjusts the counter value based on the calculated link delay.

22 Claims, 6 Drawing Sheets

UNIVERSAL SERIAL BUS (USB) CONTROLLER, METHOD OF OPERATING A USB CONTROLLER, AND MACHINE VISION SYSTEM

BACKGROUND

Machine vision systems often make use of multiple cameras to cover a wide field of vision and combine the respective images provided by the cameras for processing. In such cases, the processing system must order the separate images in the correct chronological sequence for coherent processing. While this can be done using timestamps provided as part of each video frame by the cameras, variations between the time base of the cameras results in significant errors.

Thus, there is a need for a mechanism that enables the individual cameras in a network to synchronize their respective time bases and generate accurate timestamps.

SUMMARY

According to an embodiment of a universal serial bus (USB) controller, the USB controller comprises: a USB interface configured to receive an isochronous timestamp packet (ITP) from a host device, the ITP including a current time value provided by the host device and a delay value associated with each hub through which the ITP passed; controller hardware configured to initiate a counter, send a link delay measurement (LDM) link management packet (LMP) request to a nearest upstream hub, store a first timestamp that corresponds to when the LDM LMP request was sent, receive an LDM LMP response from the nearest upstream hub, and store a second timestamp that corresponds to when the LDM LMP response was received; and controller software configured to calculate a link delay between the USB controller and the nearest upstream hub based on the first and second timestamps and delay information included in the LDM LMP response, and adjust a value of the counter based on the calculated link delay.

According to an embodiment of a method of operating a universal serial bus (USB) controller, the method comprises: initiating a counter; receiving an isochronous timestamp packet (ITP) from a host device, the ITP including a current time value provided by the host device and a delay value associated with each hub through which the ITP passed; sending a link delay measurement (LDM) link management packet (LMP) request to a nearest upstream hub; storing a first timestamp that corresponds to when the LDM LMP request was sent; receiving an LDM LMP response from the nearest upstream hub; storing a second timestamp that corresponds to when the LDM LMP response was received; calculating a link delay between the USB controller and the nearest upstream hub based on the first and second timestamps and delay information included in the LDM LMP response; and adjusting a value of the counter based on the calculated link delay.

According to an embodiment of a machine vision system, the machine vision system comprises: a plurality of cameras each configured to capture image data; a host device configured to process the image data captured by the plurality of cameras; and a plurality of hubs connected between the plurality of cameras and the host device, wherein each camera comprises a universal serial bus (USB) controller, wherein each USB controller comprises: a USB interface configured to receive an isochronous timestamp packet (ITP) from the host device, the ITP including a current time value provided by the host device and a delay value associated with each hub through which the ITP passed; controller hardware configured to initiate a counter, send a link delay measurement (LDM) link management packet (LMP) request to the nearest upstream hub, store a first timestamp that corresponds to when the LDM LMP request was sent, receive an LDM LMP response from the nearest upstream hub, and store a second timestamp that corresponds to when the LDM LMP response was received; and controller software configured to calculate a link delay between the USB controller and the nearest upstream hub based on the first and second timestamps and delay information included in the LDM LMP response, and adjust a value of the counter based on the calculated link delay.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein enable a plurality of cameras connected to a host device to synchronize their respective clocks to the host clock using periodic timestamp packets provided by the host device and applying an adjustment based on a measurement of packet transmission delay through the network. The camera clocks may be synchronized with microsecond accuracy and used to generate timestamps embedded in image data captured and forwarded by the cameras.

The clock synchronization techniques described herein utilize the precision time measurement (PTM) feature described in the Universal Serial Bus (USB) 3.2 specification. According to the USB 3.2 specification, PTM provides a technique for precisely characterizing link delays and propagation delays through a hub. Embodiments described herein propose a method where PTM messages are used to generate precise timestamps which are embedded into image metadata. The proposed implementation has both hardware and software components which work together to achieve a desired clock accuracy, e.g., 5 μs (microseconds) or less. The embodiments are explained herein in the context of PTM as described in the USB 3.2 specification but are intended to apply to each subsequent version of the USB specification that supports PTM. Accordingly, the embodiments described herein are not limited to the USB 3.2 specification but instead to any version of the USB specification that supports PTM.

Described next, with reference to the figures, are exemplary embodiments of the clock synchronization technique and corresponding USB controllers and machine vision systems that implement the clock synchronization technique.

Figure 1:
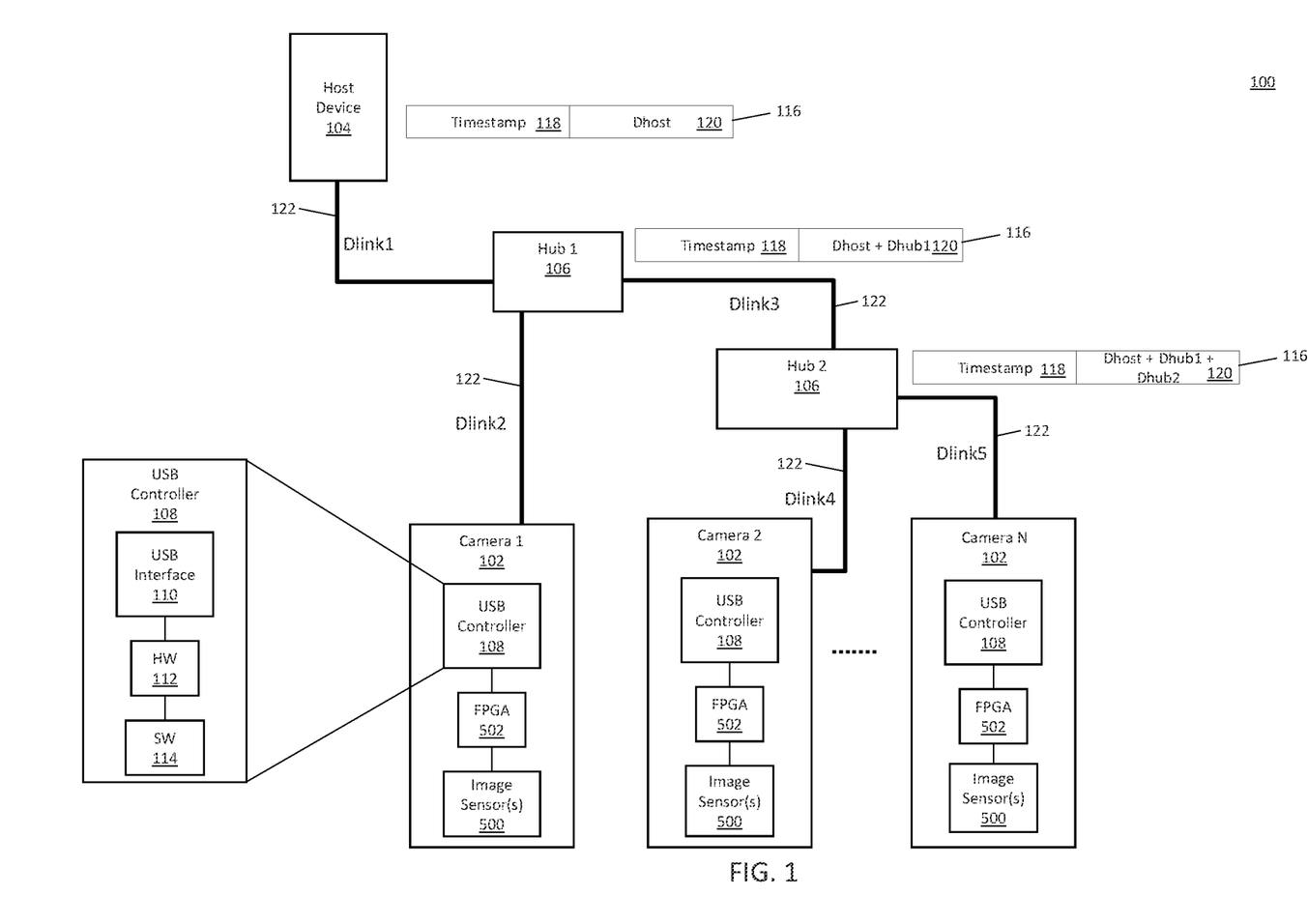
FIG. 1 illustrates a block diagram of an embodiment of a machine vision system that includes cameras configured to capture image data, a host device that processes the image data captured by the cameras, and USB hubs connected between the cameras and the host device.

FIG. 1 illustrates an embodiment of a machine vision system 100. The machine vision system 100 includes a plurality of cameras 102 each configured to capture image data, a host device 104 such as a personal computer, laptop computer, notebook computer, server, etc. that processes the image data captured by the cameras 102, and a plurality of USB hubs 106 connected between the cameras 102 and the host device 104. For example, the host device 104 may combine video frames captured and forwarded by the individual cameras 102 to form a composite video stream that covers a wide field of vision. The USB hubs 106 expand the number of ports for the host device 104 and may deliver power to the cameras 102 connected to the respective hubs 106. For example, the USB hubs 106 may be multi-port USB-PD (USB— power delivery) docks or other type of docking stations.

Each camera 102 of the machine vision system 100 includes a USB controller 108. Each USB controller 108 includes a USB interface 110, controller hardware (HW) 112 such as registers, counters, timers, logic devices, etc., and controller software (SW) 114 such as firmware. The USB interface 110 is self-configuring, hot-swappable, and defines protocols for flow control, packet framing and recovery from common errors.

When the machine vision system 100 is in use, the USB interface 110 periodically receives an isochronous timestamp packet (ITP) 116 from the host device 104. The host device 104 may multicast an ITP 116 to all downstream devices on a periodic basis, e.g., 8000 times/second, to provide a shared time-base for all hubs/devices in the network. Each ITP 116 sent by the host device 104 includes a current time value 118 provided by the host device 104 and a delay value 120 associated with each hub 106 through which the ITP 116 passed. For example, the USB 3.2 specification defines a 27-bit isochronous timestamp field at bit offset 5 of DWORD (double word) 0 of the ITP 116. The isochronous timestamp field includes a 14-bit bus interval counter value that is the current one microframe interval counter of the host device 104, where the count value rolls over to zero when the value reaches 0×3FFF and continues to increment. The isochronous timestamp field also includes a 13-bit time delta value from the start of the current ITP packet to the previous bus interval boundary. The USB 3.2 specification also defines a 14-bit correction field at bit offset 7 of DWORD 1 of the ITP 116. The correction field specifies the negative delay the ITP 116 has accumulated passing through the hubs 106 and is initially set to 0 by the host device 104. The current time value 118 provided by the host device 104 may correspond to the value in the isochronous timestamp field and the delay value 120 may correspond to the value in the correction field as defined by the USB 3.2 specification or a subsequent USB specification that utilizes PTM.

FIG. 1 illustrates an ITP 116 as the ITP 116 traverses the network. The delay value 120 included in the ITP 116 is updated to include the delay associated with each hub 106 and corresponding link 122 the ITP 116 passes through, where delay 'Dhost' corresponds to the internal delay of the host device 104, delay 'Dhub1' corresponds to the internal delay of the first hub 'Hub 1' 106 plus the delay 'Dlink1' of the link 122 that connects the host device 104 to the first hub 'Hub 1' 106, and delay 'Dhub2' corresponds to the internal delay of the second hub 'Hub 2' 106 plus the delay 'Dlink3' of the link 122 that connects the first hub 'Hub 1' 106 to the second hub 'Hub 2' 106. Section 8.4.8 of the USB 3.2 specification provides a PTM method for precisely characterizing the combined link and hub propagation delays ('Dhub1' and 'Dhub2' in FIG. 1) up to and including each hub 106. Accordingly, when the ITP 116 is received by the USB controller 108 of one of the cameras 102, the USB controller 108 can retrieve the time value 118 provided by the host device 104 and the total delay 120 from the host device 104 up to and including the last hub 106 that provided the ITP 116 to the USB controller 108. However, the ITP 116 does not account for the link delay ('Dlink2', 'Dlink4' or 'Dlink5' in FIG. 1) between the USB controller 108 that received the ITP 116 and the last (nearest) hub 106 that transmitted the ITP 116.

To ascertain the missing delay information and provide for clock synchronization across the cameras 102, the controller hardware 112 included in each USB controller 108 initiates a counter, e.g., upon receipt of an ITP 116, sends a link delay measurement (LDM) link management packet (LMP) request to the nearest upstream hub 106, stores a first timestamp 'TS1' that corresponds to when the LDM LMP request was sent, receives an LDM LMP response from the nearest upstream hub 106, and stores a second timestamp 'TS2' that corresponds to when the LDM LMP response was received. Section 8.4 of the USB 3.2 specification describes the LDM LMP protocol.

Figure 2:
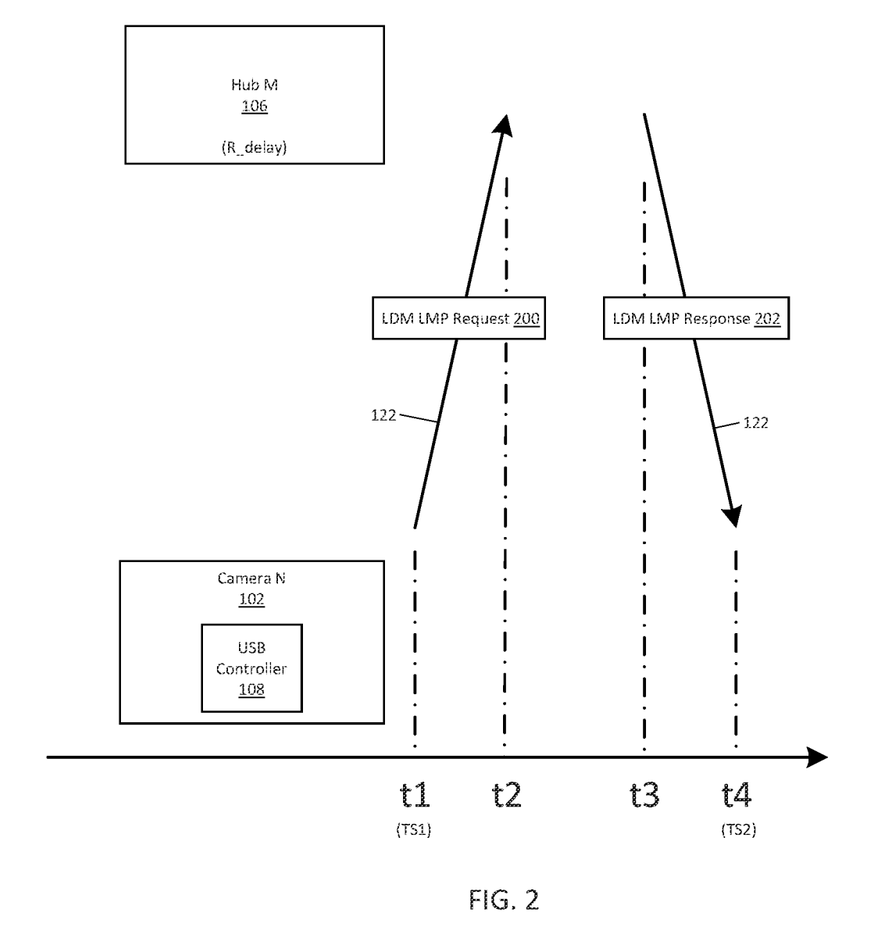
FIG. 2 illustrates the link delay measurement link management packet protocol described in section 8.4 of the USB 3.2 specification, as implemented by the USB controller included in the Nth camera of the machine vision system.

FIG. 2 illustrates the LDM LMP protocol described in section 8.4 of the USB 3.2 specification and as implemented by the USB controller 108 included in the Nth camera 102 which is connected to the Mth hub 106 of the machine vision system 100. At time t1, the USB controller hardware 112 sends on the corresponding link 122 an LDM LMP request 200 to the Mth upstream hub 106 which is the nearest hub 106 in this example. The USB controller hardware 112 also stores a first timestamp 'TS1' at time t1 and which corresponds to when the LDM LMP request 200 was sent. For example, the USB controller hardware 112 may use the value of a PTM local time source included in the USB controller 108 as the first timestamp TS1 at time t1.

The LDM LMP request 200 is received by the Mth hub 106 at time t2 due to the delay in the corresponding link 122. The Mth hub 106 transmits an LDM LMP response 202 at time t3. The Mth hub 106 includes delay information 'R_delay' in the LDM LMP response 202. The delay information R_delay corresponds to the hub propagation delay from when the Mth hub 106 receives the LDM LMP request 200 at time t2 and transmits the LDM LMP response 202 at time t3. For example, the Mth hub 106 may use the value of a PTM local time source included in the Mth hub 106 as a timestamp for time t2 when the LDM LMP request 200 is received at the hub 106 and as another timestamp when the Mth hub 106 transmits the LDM LMP response 202 at time t3, where the difference between the timestamps for times t2 and t3 corresponds to the delay information R_delay.

The USB controller hardware 112 for the Nth camera 102 receives the LDM LMP response 202 over the corresponding link 122 at time t4 and stores a second timestamp 'TS2' that corresponds to when the LDM LMP response 202 was received. For example, the USB controller hardware 112 may use the value of a PTM local time source included in the USB controller 108 as the second timestamp TS2 at time t4.

The USB controller software 114 for the Nth camera 102 calculates the link delay (e.g., Dlink2, Dlink4 or Dlink5 in FIG. 1) between the USB controller 108 and the Mth (nearest) upstream hub 106 based on the first and second timestamps TS1, TS2 stored by the USB controller hardware 112 and the delay information R_delay included in the LDM LMP response 202 transmitted by the Mth hub 106. The USB controller software 114 adjusts a value of a hardware counter used to implement the clock synchronization technique, based on the calculated link delay. In one embodiment, the controller software 114 calculates the link delay as follows:

$$(TS2-TS1-R\_delay)/2 \quad (1)$$

where TS2 is the second timestamp stored by the USB controller hardware 112 at time t4 in FIG. 2, TS1 is the first timestamp stored by the USB controller hardware 112 at time t1 in FIG. 2, and R_delay is the delay information included in the LDM LMP response 202 transmitted by the Mth (nearest) upstream hub 106.

Figure 3:
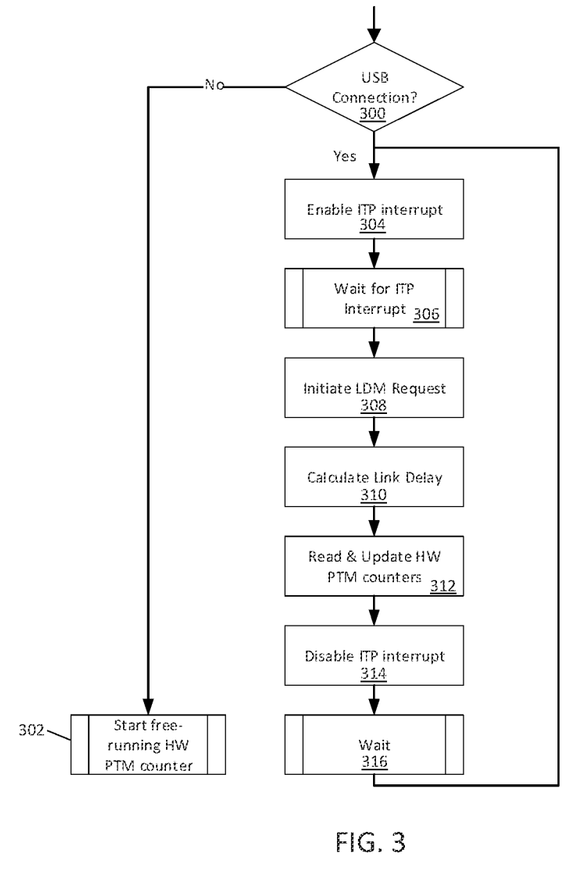
FIG. 3 illustrates a flow diagram of an embodiment of a link delay calculation process implemented by the USB controller.
Figure 4:
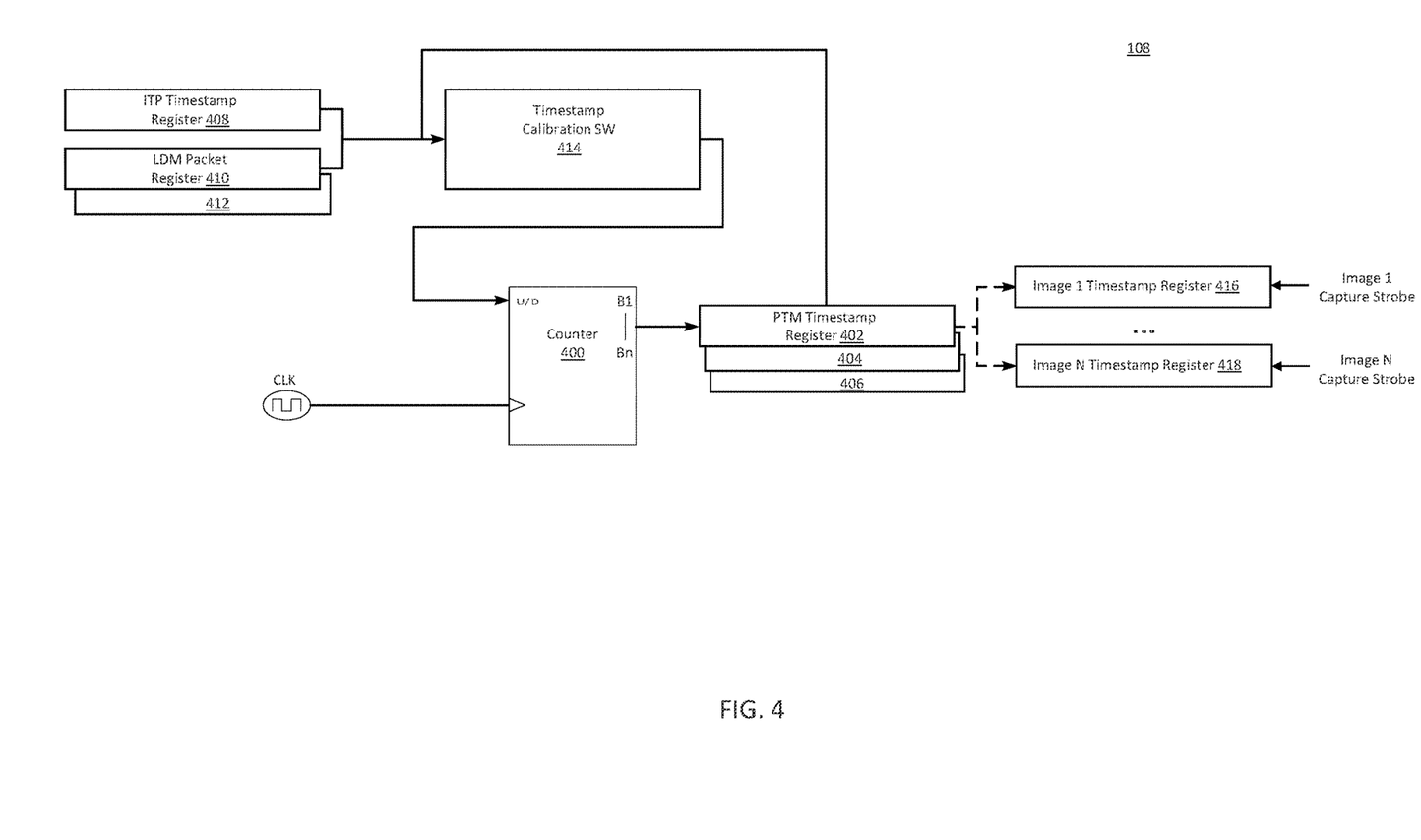
FIG. 4 illustrates a block diagram of an embodiment of the USB controller hardware and software used to implement the link delay calculation process.

FIGS. 3 and 4 illustrate an embodiment of the link delay calculation process implemented by each USB controller 108, where FIG. 3 illustrates a flow diagram of the link delay calculation process and FIG. 4 illustrates an embodiment of the controller hardware and software 112, 114 used to implement the link delay calculation process.

Before a USB connection is established (Block 300 in FIG. 3), the USB controller hardware 112 initiates a hardware counter 400 such as a free-running PTM counter (Block 302 in FIG. 3). The hardware counter 400 is actuated by a local clock CLK of the USB controller 108 and periodically synchronized to the host clock using ITP and LDM.

After establishing a USB connection, the USB controller 108 enables an ITP interrupt (Block 304 in FIG. 3) and waits for the ITP interrupt endpoint (Block 306 in FIG. 3). Upon receiving an ITP 116 at the USB interface 110 of the USB controller 108, the USB controller hardware 112 initiates an LDM LMP request 200 to the nearest upstream hub 106 (Block 308 in FIG. 3) and the USB controller software 114 calculates the link delay for the link 122 between the USB controller 108 and the nearest upstream hub 106 (Block 310 in FIG. 3), e.g., as described above in connection with FIG. 2.

The USB controller software 114 also adjusts the value of the hardware counter 400 based on the calculated link delay (Block 312 in FIG. 3). The USB controller 108 then disables the ITP interrupt (Block 314 in FIG. 3) and waits for some period of time (Block 316 in FIG. 3), e.g., 5 ms, 1 ms, etc. before reenabling the ITP interrupt (Block 304 in FIG. 3) and repeating the link delay calculation process. With this approach, the link delay calculation is periodically performed, e.g., every 5 ms, 1 ms, etc. That is, the controller hardware 112 and the controller software 114 may periodically adjust the counter 400.

In one embodiment, the USB controller software 114 adjusts the value of the hardware counter 400 by reading out the value of the counter 400, adding the calculated link delay, e.g., given by equation (1) to the value read out of the counter 400 to generate a modified value, and restarting the hardware counter 400 with the modified value. For example, as shown in FIG. 4, the USB controller hardware 112 may include a first PTM timestamp register 402 for storing the first timestamp TS1 captured by the USB controller hardware 112 at time t1 in FIG. 2, a second PTM timestamp register 404 for storing the second timestamp TS2 captured by the USB controller hardware 112 at time t4 in FIG. 2, and a third register 406 for storing the current output of the hardware counter 400. The counter value at time t1 is stored in the first PTM timestamp register 402 as TS1 and the counter value at time t4 is stored in the second PTM timestamp register 402 as TS2. The output of the hardware counter 400 has a bit range of B1 to Bn where B1 is the least significant bit and Bn is the most significant bit.

The USB controller hardware 112 may also include a fourth register 408 for storing content of the ITP 116 received by the USB controller 108. For example, the current time value 118 and the delay value 120 of the ITP 116 may be stored in the fourth register 408. The hardware counter 400 may be loaded with the ITP content stored in the fourth register 408 and started once the ITP 116 has been received, e.g., in response to the ITP interrupt (Block 306 in FIG. 3). The nearest upstream hub 106 provides LDM LMP response 202 over the corresponding link 122 as explained above in connection with FIG. 2, and the content of the LDM LMP response 202 may be stored in one or more additional registers 410, 412 of the USB controller hardware 112.

The USB controller software 114 includes timestamp calibration software 414 that adjusts the value of the hardware counter 400 based on the content of the hardware registers 402, 404, 406, 408, 410, 412. The delay adjustment operations may be performed when an ITP interrupt notification is received (Block 306 in FIG. 3). In response, the timestamp calibration software 414 initiates an LDM LMP request 200 and calculates the link delay value as described above, e.g., in accordance with equation (1). The timestamp calibration software 414 then reads the current value of the hardware counter 400 from the third register 406, adds the calculated link delay value to the current counter value, and restarts the hardware counter 400 with the adjusted value.

For example, the timestamp calibration software 410 may restart the hardware counter 400 by toggling an up/down (U/D) input of the counter 400 based on the adjusted value derived based on equation (1). Accordingly, the adjusted value of the hardware counter 400 accounts for the link delay between the USB controller 108 and the nearest upstream hub 106 and is synchronized to the reference clock of the host device 104.

Any delays between the reception of the ITP 116 and the action taken by the timestamp calibration software 410 which calculates the link delay value and adjusts the counter value accordingly are accounted since the hardware counter 400 starts running upon receipt of the ITP 116 and the timestamp calibration software 410 performs a read-modify-write operation on the counter value with minimal latencies (e.g., <500 ns). The clock synchronization is performed periodically as the local control clock CLK (e.g., 60 MHZ) used to run the hardware PTM counter 400 may have small errors which eventually lead to significant deviations between the host and device clocks. For example, assuming a 300 ppm (parts per million) accuracy measure for the internal clock CLK used to actuate the hardware counter 400, the clock synchronization process illustrated in FIG. 3 may be run once every 5 ms to limit the maximum timing error to 1.5 µs. More generally, the USB controller hardware 112 and software 114 may periodically adjust the hardware counter 400 at any desired programmable interval, e.g., 5 ms or less, e.g., down to 1 ms or less.

The USB controller hardware 112 may use the adjusted value of the hardware counter 400 to synchronize an image timestamp received from an image sensor of a USB camera 102 to the current time value provided by the host device 104. USB-based video streaming protocols such as USB Video Class (UVC) and USB3Vision allow the cameras 102 to provide a timestamp that represents the time at which an image being streamed was captured. While an optional feature, it becomes necessary to allow streams from multiple sensors to be synchronized and combined into a composite stream. The timestamp is taken at the time of image capture since there may be multiple sources of delay on the data pipe that brings the video data from the corresponding image sensor to the USB controller 108 included in the camera 102.

Figure 5:
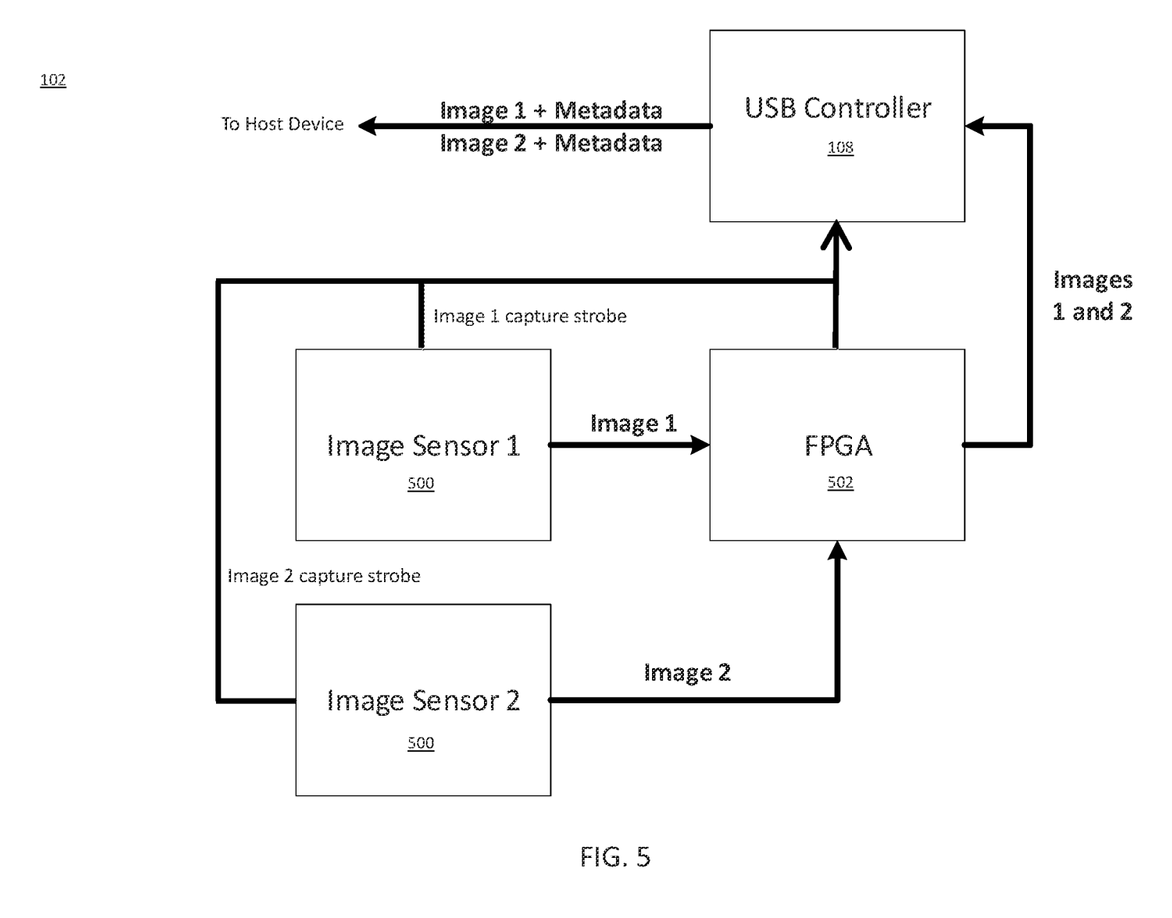
FIG. 5 illustrates a block diagram of an embodiment of the USB cameras included in the machine vision system.

FIG. 5 illustrates an embodiment of the USB cameras 102 included in the machine vision system 100. As shown in FIGS. 1 and 5, each camera 102 includes one or more image sensors 500 for capturing image data, an FPGA (field-programmable gate array) or similar type of integrated circuit 502 designed to implement image capture and processing functions, and a USB controller 108. The number of image sensors 500 included in each camera depends on the design of the USB controller 108. Two (2) image sensors 500 are shown in FIG. 5 as an example. The USB controller 108 may be designed to support one (1), two (2), four (4) or more image sensors 500. Accordingly, the host device 104 may receive four (4), eight (8), ten (10), twelve (12) or more video streams from the USB cameras 102 included in the machine vision system 100.

Each image sensor 500 captures images within the sensor field of view. For example, in FIG. 5, two (2) image sensors 500 capture respective image streams ('Image 1', 'Image 2') and the camera integrated circuit 502 processes the two image streams and provides the image data to the USB controller 108, e.g., over an LVDS (low-voltage differential signalling) interface. The images are then streamed over a USB link 122 to the host device 104. The host device 104 must know what time each image sensor 500 captured the corresponding image data to process parallel video streams and generate composite image data.

In one embodiment, a signal ('Image X Capture Strobe') from a respective image sensor 500 to the USB controller 108 indicates that the image sensor 500 is about to begin an image capture process. In response to the image capture signal, the USB controller hardware 112 stores the current value of the hardware counter 400 in a corresponding register 416, 418 associated with the image sensor 500 that sent the image capture signal, e.g., as shown in FIG. 4. The USB controller software 114 reads out the counter value from the corresponding register 416, 418 and appends the counter value to the image data received from the image sensor 500, e.g., prefixing the saved timestamp information to the image data as a header or metadata when the image data is being streamed through the USB controller 108.

In another embodiment, the controller hardware 112 included in each USB controller 108 directs an image sensor 500 included in the corresponding camera 102 to begin an image capture process and concurrently stores the current value of the hardware counter 400 in the register 416, 418 assigned to that image sensor 500. The USB controller software 114 reads out the counter value from the register 416, 418 and appends the counter value to image data received from the image sensor 500, e.g., prefixing the saved timestamp information to the image data as a header or metadata when the image data is being streamed through the USB controller 108.

In both embodiments, and since the counter value maintained by each USB controller 108 is synchronized to the host clock as explained above, the image data captured across multiple image sensors 500 of multiple cameras 102 is also synchronized to the host clock by appending the image data with the corresponding counter value. Accordingly, the host device 104 may process parallel image streams and generate composite image data based on the timestamp information appended to the image data reported by the USB controllers 108. For example, the host device 104 may use the appended timestamp information to time align the image data captured by multiple cameras 102 and reported by the corresponding USB controllers 108, to yield coherent, composite image data at the host device 104.

Figure 6:
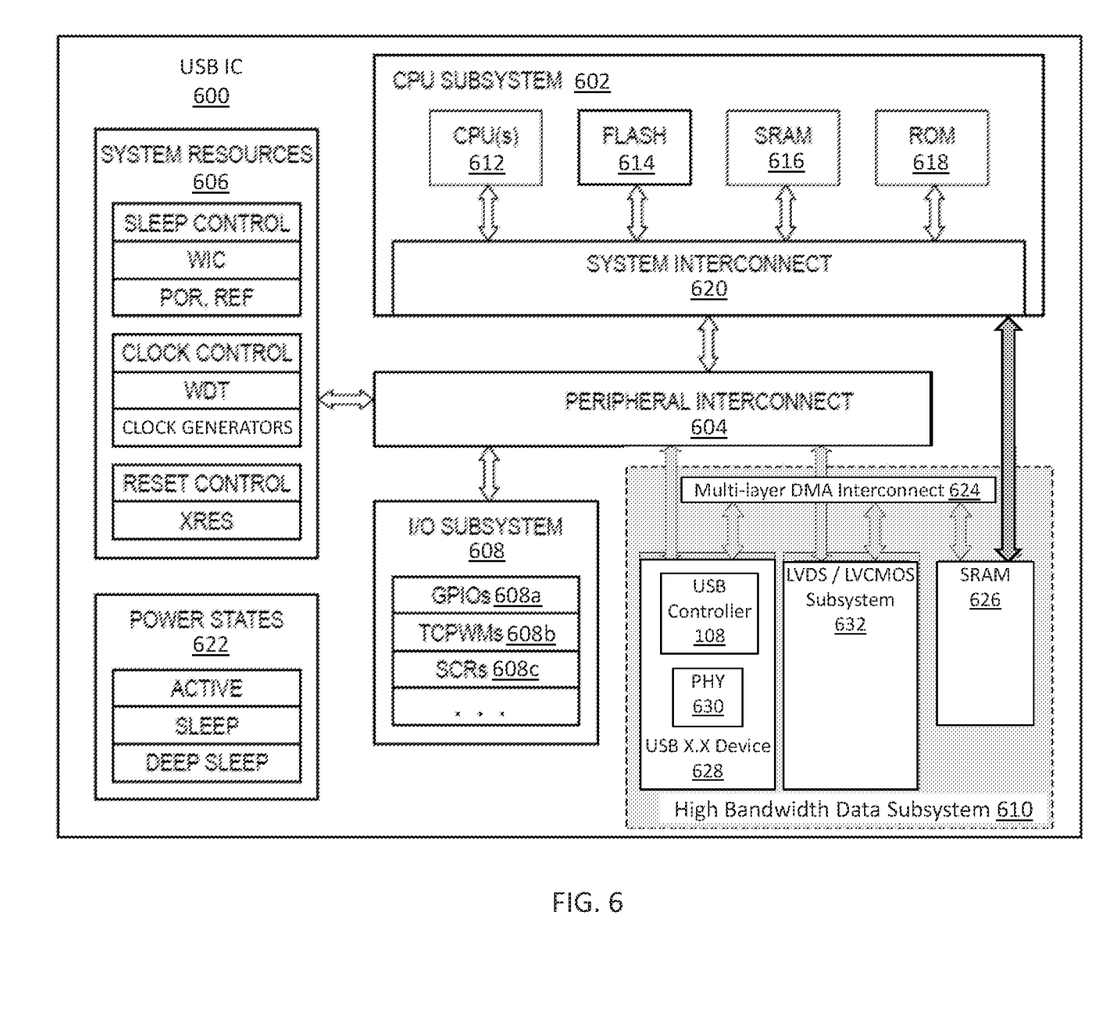
FIG. 6 illustrates a block diagram of an embodiment of a USB integrated circuit (IC) that includes the USB controller hardware and software used to implement the link delay calculation process.

FIG. 6 illustrates an embodiment of a USB integrated circuit (IC) 600 such as a USB 3.1/3.2 high-speed data controller. The USB IC 600 may be implemented as a single-chip IC manufactured on a semiconductor die. In another example, the USB IC 600 may be a single-chip IC that is manufactured as a System-on-Chip (SoC). In other embodiments, the USB IC 600 may be a multi-chip module encapsulated in a single semiconductor package.

The USB IC 600 includes a CPU (Central Processing Unit) subsystem 602, a peripheral interconnect 604, system resources 606, an input/output (I/O) subsystem 608, a high bandwidth data subsystem 610, and various terminals (e.g., pins) that are configured for receiving and sending signals.

The CPU subsystem 602 may include one or more CPUs 612, flash memory 614, SRAM (Static Random Access Memory) 616, ROM (Read Only Memory) 618, etc. that are coupled to system interconnect 620. Each CPU 612 is a suitable processor that can operate in an IC or a SoC device. The flash memory 614 is non-volatile memory (e.g., NAND flash, NOR flash, etc.) that is configured for storing data, programs, and/or other firmware instructions. The flash memory 614 is tightly coupled within the CPU subsystem 602 for improved access times. The SRAM 616 is volatile memory that is configured for storing data and firmware instructions accessed by each CPU 612. The ROM 618 is read-only memory (or other suitable storage medium) that is configured for storing boot-up routines, configuration parameters, and other firmware parameters and settings. The system interconnect 620 is a system bus (e.g., a single-level or multi-level Advanced High-Performance Bus, or AHB) that is configured as an interface that couples the various components of the CPU subsystem 602 to each other, as well as a data and control interface between the various components of the CPU subsystem 602 and the peripheral interconnect 604.

The peripheral interconnect 604 is a peripheral bus (e.g., a single-level or multi-level AHB) that provides the primary data and control interface between the CPU subsystem 602 and its peripherals and other resources, such as the system resources 606, the I/O subsystem 608, and the high bandwidth data subsystem 610. The peripheral interconnect 604 may include various controller circuits (e.g., direct memory access, or DMA controllers), which may be programmed to transfer data between peripheral blocks without burdening the CPU subsystem 602. In various embodiments, each of the components of the CPU subsystem 602 and the peripheral interconnect 604 may be different with each choice or type of CPU, system bus, and/or peripheral bus.

The system resources 606 include various electronic circuits that support the operation of the USB IC 600 in its various states and modes. For example, the system resources 606 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow the USB IC 600 to draw and/or provide power from/to external sources with several different voltage and/or current levels and to support controller operation in several power states 622 (e.g., such as active state, sleep state, and a deep sleep state with clocks turned off). Further, in some embodiments the CPU subsystem 602 may be optimized for low-power operation with extensive clock gating and may include various internal controller circuits that allow the CPU subsystem 602 to operate in the various power states 622. For example, the CPU subsystem 602 may include a wake-up interrupt controller that is configured to wake the CPU subsystem 602 from a sleep state, thereby allowing power to be switched off when the IC chip is in the sleep state. The system resources 606 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. The system resources 606 may also include analog and/or digital circuit blocks that provide reset control and support external reset (XRES).

The I/O subsystem 608 includes several different types of I/O blocks and subsystems. For example, the I/O subsystem 608 includes GPIO (general purpose input output) blocks 608a, TCPWM (timer/counter/pulse-width-modulation) blocks 608b, and SCBs (serial communication blocks) 608c. The GPIOs 608a include analog and/or digital circuits configured to implement various functions such as, for example, pull-ups, pull-downs, input threshold select, input and output buffer enabling/disabling, multiplex signals connected to various I/O pins, etc. The TCPWMs 608b include analog and/or digital circuits configured to implement timers, counters, pulse-width modulators, decoders and various other analog/mixed signal elements that are configured to operate on input/output signals. The SCBs 608c include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock extension Peripheral Interface), etc.

The high bandwidth data subsystem 610 provides DMA (direct memory access) data transfers from LVDS (low-voltage differential signalling)/LVCMOS (low-voltage CMOS) input to USB output at speeds up to 10 Gbps for USB 3.2 Gen 2, 20 Gbps for USB 3.2 Gen 2×2 transfer rates, 40 Gbps for USB 4, etc. The high bandwidth data subsystem 610 includes a multi-layer DMA interconnect 624, SRAM 626 for buffering USB data, a USB device 628 that includes one or more USB PHY (physical interface) 630 for implementing USB 2.X, 3.X, 4.X, etc. endpoints with transmission speeds of 480 Mbps, 5 Gbps, 10 Gbps, 20 Gbps, 40 Gbps, etc., one or more USB controllers 108 and related circuitry, and an LVDS/LVCMOS subsystem 632 for providing an LVDS/LVCMOS interface.

In accordance with the clock synchronization techniques described herein, the USB controller 108 included in the high bandwidth data subsystem 610 includes the controller hardware 112 and software 114 described herein. The controller hardware 112 and software 114 synchronize the internal USB clock to the host clock using periodic timestamp packets provided by the host device 104 and applying an adjustment based on a measurement of packet transmission delay through the network, as described herein, to ensure the camera clocks may be synchronized with microsecond accuracy and used to generate timestamps embedded in image data captured and forwarded by the USB cameras 102.

Although the present disclosure is not so limited, the following numbered examples demonstrate one or more aspects of the disclosure.

Example 1. A universal serial bus (USB) controller, comprising: a USB interface configured to receive an isochronous timestamp packet (ITP) from a host device, the ITP including a current time value provided by the host device and a delay value associated with each hub through which the ITP passed; controller hardware configured to initiate a counter, send a link delay measurement (LDM) link management packet (LMP) request to a nearest upstream hub, store a first timestamp that corresponds to when the LDM LMP request was sent, receive an LDM LMP response from the nearest upstream hub, and store a second timestamp that corresponds to when the LDM LMP response was received; and controller software configured to calculate a link delay between the USB controller and the nearest upstream hub based on the first and second timestamps and delay information included in the LDM LMP response, and adjust a value of the counter based on the calculated link delay.

Example 2. The USB controller of example 1, wherein the controller software is configured to calculate the link delay as $(TS2-TS1-R\_delay)/2$, where TS2 is the second timestamp, TS1 is the first timestamp, and R_delay is the delay information included in the LDM LMP response.

Example 3. The USB controller of example 1 or 2, wherein the controller software is configured to adjust the value of the counter by reading out the value of the counter, adding the calculated link delay to the value read out of the counter to generate a modified value, and restarting the counter with the modified value.

Example 4. The USB controller of any of examples 1 through 3, wherein the controller hardware comprises a first register configured to store the first timestamp, a second register configured to store the second timestamp, and a third register configured to store an output of the counter.

Example 5. The USB controller of example 4, wherein the controller hardware comprises a fourth register configured to store content of the ITP.

Example 6. The USB controller of any of examples 1 through 5, wherein the controller hardware and the controller software are configured to periodically adjust the counter.

Example 7. The USB controller of example 6, wherein the controller hardware and the controller software are configured to periodically adjust the counter at a programmable interval.

Example 8. The USB controller of example 7, wherein the programmable interval is 5 ms.

Example 9. The USB controller of example 7, wherein the programmable interval is 1 ms.

Example 10. The USB controller of any of examples 1 through 9, wherein in response to a signal from an image sensor indicating that the image sensor is about to begin an image capture process, the controller hardware is configured to store the current value of the counter in a register, and wherein the controller software is configured to read out the value of the counter from the register and append the value to image data received from the image sensor.

Example 11. The USB controller of any of examples 1 through 10, wherein the controller hardware is configured to direct an image sensor to begin an image capture process and concurrently store the current value of the counter in a register, and wherein the controller software is configured to read out the value of the counter from the register and append the value to image data received from the image sensor.

Example 12. The USB controller of any of examples 1 through 11, wherein the controller hardware is configured to use the adjusted value of the counter to synchronize an image timestamp received from an image sensor to the current time value provided by the host device.

Example 13. A method of operating a universal serial bus (USB) controller, the method comprising: initiating a counter; receiving an isochronous timestamp packet (ITP) from a host device, the ITP including a current time value provided by the host device and a delay value associated with each hub through which the ITP passed; sending a link delay measurement (LDM) link management packet (LMP) request to a nearest upstream hub; storing a first timestamp that corresponds to when the LDM LMP request was sent; receiving an LDM LMP response from the nearest upstream hub; storing a second timestamp that corresponds to when the LDM LMP response was received; calculating a link delay between the USB controller and the nearest upstream hub based on the first and second timestamps and delay information included in the LDM LMP response; and adjusting a value of the counter based on the calculated link delay.

Example 14. The method of example 13, wherein calculating the link delay comprises: calculating (TS2−TS1−R_delay)/2, where TS2 is the second timestamp, TS1 is the first timestamp, and R_delay is the delay information included in the LDM LMP response.

Example 15. The method of example 13 or 14, wherein adjusting the value of the counter comprises: reading out the value of the counter; adding the calculated link delay to the value read out of the counter to generate a modified value; and restarting the counter with the modified value.

Example 16. The method of any of examples 13 through 15, further comprising: periodically adjusting the counter.

Example 17. The method of example 16, wherein the counter is periodically adjusted at a programmable interval.

Example 18. The method of example 17, wherein the programmable interval is 5 ms or less.

Example 19. The method of any of examples 13 through 18, further comprising: in response to a signal from an image sensor indicating that the image sensor is about to begin an image capture process, storing the current value of the counter in a register; reading out the value of the counter from the register and appending the value to image data received from the image sensor.

Example 20. The method of any of examples 13 through 19, further comprising: directing an image sensor to begin an image capture process and concurrently storing the current value of the counter in a register; and reading out the value of the counter from the register and appending the value to image data received from the image sensor.

Example 21. The method of any of examples 13 through 20, further comprising: using the adjusted value of the counter to synchronize an image timestamp received from an image sensor to the current time value provided by the host device.

Example 22. A machine vision system, comprising: a plurality of cameras each configured to capture image data; a host device configured to process the image data captured by the plurality of cameras; and a plurality of hubs connected between the plurality of cameras and the host device, wherein each camera comprises a universal serial bus (USB) controller, wherein each USB controller comprises: a USB interface configured to receive an isochronous timestamp packet (ITP) from the host device, the ITP including a current time value provided by the host device and a delay value associated with each hub through which the ITP passed; controller hardware configured to initiate a counter, send a link delay measurement (LDM) link management packet (LMP) request to the nearest upstream hub, store a first timestamp that corresponds to when the LDM LMP request was sent, receive an LDM LMP response from the nearest upstream hub, and store a second timestamp that corresponds to when the LDM LMP response was received; and controller software configured to calculate a link delay between the USB controller and the nearest upstream hub based on the first and second timestamps and delay information included in the LDM LMP response, and adjust a value of the counter based on the calculated link delay.

Example 23. The machine vision system of example 22, wherein in response to a signal from an image sensor included in one of the cameras indicating that the image sensor is about to begin an image capture process, the controller hardware included in the USB controller for the camera is configured to store the current value of the counter in a register, and wherein the controller software included in the USB controller for the camera is configured to read out the value of the counter from the register and append the value to image data received from the image sensor.

Example 24. The machine vision system of example 22 or 23, wherein the controller hardware included in the USB controllers is configured to direct an image sensor to begin an image capture process and concurrently store the current value of the counter in a register and the controller software is configured to read out the value of the counter from the register and append the value to image data received from the image sensor.

Example 25. The machine vision system of any of examples 22 through 24, wherein the controller hardware included in the USB controllers is configured to use the adjusted value of the counter to synchronize an image timestamp received from an image sensor of a camera to the current time value provided by the host device.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A universal serial bus (USB) controller, comprising:
a USB interface configured to receive an isochronous timestamp packet (ITP) from a host device, the ITP including a current time value provided by the host device and a delay value associated with each hub through which the ITP passed;
controller hardware configured to initiate a counter, send a link delay measurement (LDM) link management packet (LMP) request to a nearest upstream hub, store a first timestamp that corresponds to when the LDM LMP request was sent, receive an LDM LMP response from the nearest upstream hub, and store a second timestamp that corresponds to when the LDM LMP response was received; and
controller software configured to calculate a link delay between the USB controller and the nearest upstream hub based on the first and second timestamps and delay information included in the LDM LMP response, and adjust a value of the counter based on the calculated link delay.

2. The USB controller of claim 1, wherein the controller software is configured to calculate the link delay as (TS2−TS1−R_delay)/2, where TS2 is the second timestamp, TS1 is the first timestamp, and R_delay is the delay information included in the LDM LMP response.

3. The USB controller of claim 1, wherein the controller software is configured to adjust the value of the counter by reading out the value of the counter, adding the calculated link delay to the value read out of the counter to generate a modified value, and restarting the counter with the modified value.

4. The USB controller of claim 1, wherein the controller hardware comprises a first register configured to store the first timestamp, a second register configured to store the second timestamp, and a third register configured to store an output of the counter.

5. The USB controller of claim 4, wherein the controller hardware comprises a fourth register configured to store content of the ITP.

6. The USB controller of claim 1, wherein the controller hardware and the controller software are configured to periodically adjust the counter.

7. The USB controller of claim 6, wherein the controller hardware and the controller software are configured to periodically adjust the counter at a programmable interval.

8. The USB controller of claim 1, wherein in response to a signal from an image sensor indicating that the image sensor is about to begin an image capture process, the controller hardware is configured to store the current value of the counter in a register, and wherein the controller software is configured to read out the value of the counter from the register and append the value to image data received from the image sensor.

9. The USB controller of claim 1, wherein the controller hardware is configured to direct an image sensor to begin an image capture process and concurrently store the current value of the counter in a register, and wherein the controller software is configured to read out the value of the counter from the register and append the value to image data received from the image sensor.

10. The USB controller of claim 1, wherein the controller hardware is configured to use the adjusted value of the counter to synchronize an image timestamp received from an image sensor to the current time value provided by the host device.

11. A method of operating a universal serial bus (USB) controller, the method comprising:
initiating a counter;
receiving an isochronous timestamp packet (ITP) from a host device, the ITP including a current time value provided by the host device and a delay value associated with each hub through which the ITP passed;
sending a link delay measurement (LDM) link management packet (LMP) request to a nearest upstream hub;
storing a first timestamp that corresponds to when the LDM LMP request was sent;
receiving an LDM LMP response from the nearest upstream hub;
storing a second timestamp that corresponds to when the LDM LMP response was received;
calculating a link delay between the USB controller and the nearest upstream hub based on the first and second timestamps and delay information included in the LDM LMP response; and
adjusting a value of the counter based on the calculated link delay.

12. The method of claim 11, wherein calculating the link delay comprises:
calculating (TS2−TS1−R_delay)/2, where TS2 is the second timestamp, TS1 is the first timestamp, and R_delay is the delay information included in the LDM LMP response.

13. The method of claim 11, wherein adjusting the value of the counter comprises:
reading out the value of the counter;
adding the calculated link delay to the value read out of the counter to generate a modified value; and
restarting the counter with the modified value.

14. The method of claim 11, further comprising:
periodically adjusting the counter.

15. The method of claim 14, wherein the counter is periodically adjusted at a programmable interval.

16. The method of claim 11, further comprising:
in response to a signal from an image sensor indicating that the image sensor is about to begin an image capture process, storing the current value of the counter in a register;
reading out the value of the counter from the register and appending the value to image data received from the image sensor.

17. The method of claim 11, further comprising:
directing an image sensor to begin an image capture process and concurrently storing the current value of the counter in a register; and
reading out the value of the counter from the register and appending the value to image data received from the image sensor.

18. The method of claim 11, further comprising:
using the adjusted value of the counter to synchronize an image timestamp received from an image sensor to the current time value provided by the host device.

19. A machine vision system, comprising:
a plurality of cameras each configured to capture image data;
a host device configured to process the image data captured by the plurality of cameras; and
a plurality of hubs connected between the plurality of cameras and the host device, wherein each camera comprises a universal serial bus (USB) controller, wherein each USB controller comprises:
  a USB interface configured to receive an isochronous timestamp packet (ITP) from the host device, the ITP including a current time value provided by the host device and a delay value associated with each hub through which the ITP passed;
  controller hardware configured to initiate a counter, send a link delay measurement (LDM) link management packet (LMP) request to the nearest upstream hub, store a first timestamp that corresponds to when the LDM LMP request was sent, receive an LDM LMP response from the nearest upstream hub, and store a second timestamp that corresponds to when the LDM LMP response was received; and
  controller software configured to calculate a link delay between the USB controller and the nearest upstream hub based on the first and second timestamps and delay information included in the LDM LMP response, and adjust a value of the counter based on the calculated link delay.

20. The machine vision system of claim 19, wherein in response to a signal from an image sensor included in one of the cameras indicating that the image sensor is about to begin an image capture process, the controller hardware included in the USB controller for the camera is configured to store the current value of the counter in a register, and wherein the controller software included in the USB controller for the camera is configured to read out the value of the counter from the register and append the value to image data received from the image sensor.

21. The machine vision system of claim 19, wherein the controller hardware included in the USB controllers is configured to direct an image sensor to begin an image capture process and concurrently store the current value of the counter in a register and the controller software is configured to read out the value of the counter from the register and append the value to image data received from the image sensor.

22. The machine vision system of claim 19, wherein the controller hardware included in the USB controllers is configured to use the adjusted value of the counter to synchronize an image timestamp received from an image sensor of a camera to the current time value provided by the host device.

* * * * *

UNITED STATES PATENT AND TRADEMARK OFFICE
CERTIFICATE OF CORRECTION

| | | |
|---|---|---|
| PATENT NO. | : 12,124,399 B2 | Page 1 of 1 |
| APPLICATION NO. | : 18/093565 | |
| DATED | : October 22, 2024 | |
| INVENTOR(S) | : K. Sivaramakrishnan et al. | |

It is certified that error appears in the above-identified patent and that said Letters Patent is hereby corrected as shown below:

In the Drawings

On figure 6, at I/O Subsystem, please change "SCRs" to -- SCBs --.

Signed and Sealed this
Second Day of September, 2025

Coke Morgan Stewart
*Acting Director of the United States Patent and Trademark Office*